(12) United States Patent
Shinoda

(10) Patent No.: US 11,434,680 B2
(45) Date of Patent: Sep. 6, 2022

(54) STABILIZER BAR

(71) Applicant: NEWFREY LLC, New Britain, CT (US)

(72) Inventor: Yoshinori Shinoda, Utsunomiya (JP)

(73) Assignee: NEWFREY LLC, New Britain, CT (US)

( * ) Notice: Subject to any disclaimer, the term of this patent is extended or adjusted under 35 U.S.C. 154(b) by 272 days.

(21) Appl. No.: 16/700,170

(22) Filed: Dec. 2, 2019

(65) Prior Publication Data

US 2020/0141170 A1 May 7, 2020

Related U.S. Application Data

(63) Continuation of application No. PCT/JP2018/021249, filed on Jun. 1, 2018.

(51) Int. Cl.
| | | |
|---|---|---|
| *E05F 3/18* | (2006.01) | |
| *E05F 7/04* | (2006.01) | |
| *B60R 7/04* | (2006.01) | |
| *B60N 3/10* | (2006.01) | |

(52) U.S. Cl.
CPC .......... *E05F 7/04* (2013.01); *B60R 7/04* (2013.01); *B60N 3/102* (2013.01); *E05F 3/18* (2013.01)

(58) Field of Classification Search
CPC ..... E05F 7/04; E05F 3/18; B60R 7/04; B60N 3/102; B60N 3/10; A47K 1/08
USPC ............................................ 248/311.2, 309.1
See application file for complete search history.

(56) References Cited

U.S. PATENT DOCUMENTS

| | | | | |
|---|---|---|---|---|
| 5,427,447 | A * | 6/1995 | Satoh ..................... | B60N 3/102 108/45 |
| 5,671,877 | A * | 9/1997 | Yabuya .................. | B60N 3/106 224/282 |
| 5,876,007 | A * | 3/1999 | Lancaster .............. | B60N 3/102 248/311.2 |
| 5,897,089 | A * | 4/1999 | Lancaster .............. | B60N 3/106 248/311.2 |
| 6,923,517 | B2 * | 8/2005 | Yamamoto ............. | B60N 3/102 248/311.2 |

(Continued)

FOREIGN PATENT DOCUMENTS

| | | |
|---|---|---|
| JP | 2003-082925 A | 3/2003 |
| JP | 2008-155794 A | 7/2008 |
| JP | 2009190599 A | 8/2009 |

OTHER PUBLICATIONS

European Search Report dated Nov. 6, 2020.

*Primary Examiner* — Nkeisha Smith
(74) *Attorney, Agent, or Firm* — Michael P. Leary

(57) ABSTRACT

A stabilizer comprises housing, a lever, and a plate spring. The lever has a shaft, a main body extending radially from the shaft, an elongated portion extending at an angle from the main body, and a cam portion extending from the shaft in a substantially opposite direction to the main body. A tip of the elongated portion extends outward through an opening in the housing. The plate spring has a plane portion fixed to the housing, and a curved portion pushed by the lever cam portion. When the stabilizer is attached to a fixed member (case). The lever tip portion extends from the opening of the housing and abuts to the surface of a slide member (holder). The lever tip exerts a constant load to the surface of the slide member, even if the distance between the fixed member and the slide member changes.

20 Claims, 11 Drawing Sheets

(56) References Cited

U.S. PATENT DOCUMENTS

| | | | |
|---|---|---|---|
| 2003/0062458 A1* | 4/2003 | Leopold | B64D 11/0007 248/310 |
| 2007/0128904 A1 | 6/2007 | Kang et al. | |
| 2013/0112831 A1* | 5/2013 | Kong | B60N 3/106 248/311.2 |
| 2019/0381941 A1* | 12/2019 | Fukui | B60R 7/04 |

* cited by examiner

STABILIZER BAR

CROSS-REFERENCE TO RELATED APPLICATIONS

This application is a continuation of PCT Application No. PCT/JP2018/021249, filed on Jun. 1, 2018 which claims priority from Japanese Patent Application No. 2017-109729, filed on Jun. 2, 2017, the entire disclosure of which is incorporated herein by reference.

BACKGROUND OF THE PRESENT INVENTION

The present invention relates to a stabilizer for sliding a sliding member, such as an accessory case of an automobile, and a mounting structure using such a stabilizer.

A sliding member such as an accessory case or a cup holder is slidably attached to a fixing member such as a panel in a vehicle interior. A slide structure is provided for sliding the slide member. The slide structure requires that the slide member operate smoothly with a constant load and that no problems occur such as rattling. For this reason, it is necessary to adjust the size of the fixing member such as the panel of the automobile and the slide member so that the mutual dimensions are accurately matched, and the sliding load becomes constant. The mold for creating the fixing member and slide member must be created with high dimensional accuracy; furthermore, care must be taken to avoid dimensional variations in the mass production process.

Therefore, there has been a demand for a slide structure that can operate smoothly with a constant load without having to make detailed dimensional adjustments of the fixing member and slide member. In addition, there has been a demand for a slide structure that does not rattle or generate noise during operation of the slide member or during driving an automobile.

Patent Document 1 discloses a slide structure of a movable member provided with a fixing member, a movable member (slide member), a sliding member and a ball plunger. The ball plunger presses the movable member against the sliding surface with the movable member of the sliding member by biasing the ball with a spring. Therefore, the sliding resistance between the ball and the movable member can be reduced.

Since the slide structure of Patent Document 1 uses a ball plunger and presses the movable member with an appropriate load, it can prevent rattling and abnormal noise. Moreover, the load which presses the sliding member can be changed by changing the spring which presses the ball plunger.

However, with the slide structure of Patent Document 1, the distance between the ball plunger and the movable member changes due to dimensional variations in the members such as the fixing member and the movable member, and the sliding resistance changes. As a result, the load required to operate a movable member such as a drawer using this slide structure varies.

Patent Document 2 discloses a support structure for a sliding body (slide member) such as a door provided between a pair of rails (fixing members). A spring member that is slidable with respect to the rail is assembled on the edge facing the rail of the sliding body. The spring member is formed in three directions with elastically deformable elastic pieces (plate springs) that come into contact with the inner surface of the rail. With the support structure of Patent Document 2, since the spring member is displaced according to the variation in the distance between the sliding body and the rail, the variation in the distance can be absorbed and the sliding body can be operated smoothly.

However, with the support structure of Patent Document 2, the elastic force of the elastic piece changes due to the dimensional variation of the sliding body. Therefore, the sliding load of the sliding body changes.

Therefore, there has been a demand for a slide structure in which the slide member operates smoothly with a constant load even if the dimensions of the fixing member and the slide member are not precisely adjusted. In addition, there has been a demand for a slide structure that does not rattle or generate noise during operation of the slide member or during driving the automobile. In addition, there is a need for a slide structure that can cope with dimensional variations of movable members during mass production.

Patent Document 1: Japanese Unexamined Patent Application Publication No. 2008-155794.
Patent Document 2: Japanese Unexamined Patent Application Publication No. 2003-082925.

SUMMARY OF THE PRESENT INVENTION

Therefore, an object of the present invention is to provide a component (stabilizer) in which a slide member can operate smoothly with a constant load, even if the dimensions of the fixing member and the slide member are not precisely adjusted, and a mounting structure using such a component.

Further, an object of the present invention is to provide a mounting structure that does not rattle or generate abnormal noise during operation of a slide member or during the driving an automobile.

In the present invention, with the structure in which a slide member is slidably attached to a fixing member, a stabilizer is attached to the fixing member, and the tip of a lever coming out from the opening of the stabilizer presses the slide member. Even if the distance between the surface of the stabilizer and the slide member changes, the load with which the lever tip presses the slide member becomes substantially constant. Therefore, the load for sliding the slide member is almost constant.

A first aspect of the present invention is a stabilizer that is attached to a fixing member and slidably supports a slide member within the fixing member; equipped with the following: a housing having an opening; a lever having a lever shaft part housed in the housing, a lever body part extending from the lever shaft part, a lever extension part curved from the lever body part, and a lever cam part extending in a direction opposite to the lever body part from the lever shaft part; and a sheet metal spring having a flat plate part fixed to the housing, and a curved surface part that is adjacent to the flat plate part and can be bent by contact with a lever contact part at a tip of the lever cam part; wherein the lever tip part of the lever extension part protrudes from the opening part of the housing.

When the stabilizer has a lever in the housing and a sheet metal spring, at the time the lever extension part of the lever is pushed, the lever cam part bends the curved surface part of the sheet metal spring, obtains a certain reaction force, and a pressing force is generated at the tip of the lever.

When the housing has an opening, the lever tip part of the lever extension part comes out of the opening, and the lever tip part is able to contact the slide member.

The lever extension part is preferably bent at a right-angle with respect to the lever body part.

If the lever extension part is bent at right-angles to the lever body part, the lever extension part can abut against the surface of the slide member with a gap open.

It is preferable that the axis of the lever cam part of the lever have a certain angle with respect to the axis of the lever body part.

When the axis of the lever cam part of the lever is at a fixed angle with respect to the axis of the lever body part, it can easily come into contact with the curved surface part of the sheet metal spring.

The housing preferably has a shaft hole part rotatably supporting the lever shaft part, an opening part for the lever extension part to go out of the housing, and a flat plate part fixing part for fixing the flat plate part of the sheet metal spring.

When the housing has a shaft hole part that rotatably supports the lever shaft part, the lever can be rotated about the shaft center. If the housing has an opening part for the lever extension part to go out of the housing, the lever extension part is able to come out of the opening part and come into contact with the surface of the slide member.

The curvature radius of the curved surface part of the sheet metal spring is preferably smaller than the radius of rotation at which the lever contact part of the lever cam part of the lever rotates about the lever shaft part.

If the radius of curvature of the curved part of the sheet metal spring is smaller than the radius of rotation where the lever contact part of the lever cam part rotates about the lever shaft part, when the lever cam part is rotated, the lever contact part can easily come into contact with the curved surface part of the sheet metal spring.

When the lever cam part of the lever rotates about the lever shaft part, it is preferable that the lever contact part push the curved surface part of the sheet metal spring to bend the curved surface part.

When the lever contact part pushes the curved surface part of the sheet metal spring and the amount of bending increases, the pressing force required to bend the sheet metal spring increases.

When the lever cam part of the lever rotates about the lever shaft part, it is preferable for the distance, from a boundary part between the flat plate part and the curved surface part to which the sheet metal spring is fixed, to a contact point where the lever contact part abuts on the curved surface part of the sheet metal spring, to be increased.

As the distance from the flat part—which is the fixed part of the sheet metal spring—to the contact point between the sheet metal spring and the lever increases, the pressing force required to deflect the sheet metal spring decreases.

It is preferable for the housing to have an outer abutting part that restricts movement of the lever tip part of the lever out of the housing, and an inner abutting part that restricts movement of the lever tip part of the lever into the housing.

When the housing has an outer contact part that restricts movement of the lever tip part of the lever to the outside of the housing and an inner contact part that restricts movement of the lever tip part of the lever into the housing, the operating range of the lever is limited.

The lever preferably has a lever reinforcing part inside the curved part between the lever body part and the lever extension part, that restricts movement of the lever tip part of the lever to the outside and reinforces the lever.

When there is a lever reinforcing part inside the curved part between the lever body part and the lever extension part that restricts movement of the lever tip part of the lever to the outside and reinforces the lever, the lever tip part is restricted from moving outward by contacting the outer contact part, and the lever is reinforced.

The second aspect of the present invention is an attachment structure in which a slide member is slidably attached within a fixing member, provided with a stabilizer attached to the fixing member; wherein: the fixing member has a base part, a stabilizer mounting part formed on the base part, and a support part for slidably supporting the slide member; the stabilizer has a housing having an opening part; a lever shaft housed in the housing part; a lever body part extending from the lever shaft part; a lever extension part that curves from the lever body part, the tip part of which extends out of the opening part of the housing; a lever having a lever cam part extending in a direction opposite to the lever body part from the lever shaft part; a flat plate part fixed to the housing; and a sheet metal spring adjacent to the flat plate part, having a curved surface part capable of being bent by contact with the lever cam part; and the slide member has a grounding surface that is supported by the support part, that a lever tip part of the lever extension part of the stabilizer is able to contact.

The slide member can be slid into the fixing member, and when a stabilizer is attached to the fixing member and the lever tip part of the stabilizer contacts the grounding surface of the slide member, by pressing the slide member with a constant load, the slide member can be smoothly slid.

Preferably, the stabilizer is attached to an upper surface of the fixing member, and the lever tip part of the stabilizer is in contact with the grounding surface of the upper surface of the slide member.

When the stabilizer is attached to the upper surface of the fixing member and the lever tip part of the stabilizer is in contact with the grounding surface on the top surface of the slide member, rattling will not occur even if the slide member is slid and inserted in and out of the fixing member.

Preferably, the stabilizer is attached to a side surface of the fixing member, and the lever tip part of the stabilizer is in contact with the grounding surface on the side surface of the slide member.

When the stabilizer is attached to the side surface of the fixing member, and the tip end part of the lever of the stabilizer is in contact with the grounding surface on the side surface of the slide member, the slide member can be held so as not to be displaced laterally.

Two stabilizers are preferably attached to the upper surface of the fixing member.

If two stabilizers are attached to the left and right of the top surface of the fixing member, the slide member can be pressed from the top and left and right to slide smoothly.

By the lever tip parts of the two stabilizers attached to the left and right of the upper surface of the fixing member, the side surface of the grounding surface on the upper surface of the slide member can be supported and held so that the slide member does not shift laterally.

Preferably, the fixing member is a case, and the slide member is a holder accommodated in the case.

If the holder is an accessory holder, the accessory holder can be pulled out of the case to accommodate the accessory. If the holder is a cup holder, the cup holder can be pulled out of the case to hold the cup with the drink.

According to the present invention, it is possible to obtain an attachment structure in which the slide member operates smoothly with a constant load without making the fixing member and the slide member by accurately adjusting the dimensions.

Further, according to the present invention, since the stabilizer follows the dimensional variation of the slide member and the pressing load is constant, it is possible to obtain a mounting structure in which the load necessary for the operation is constant and no rattling or abnormal noise occurs.

DETAILED DESCRIPTION OF THE PREFERRED EMBODIMENTS

Figure 1:
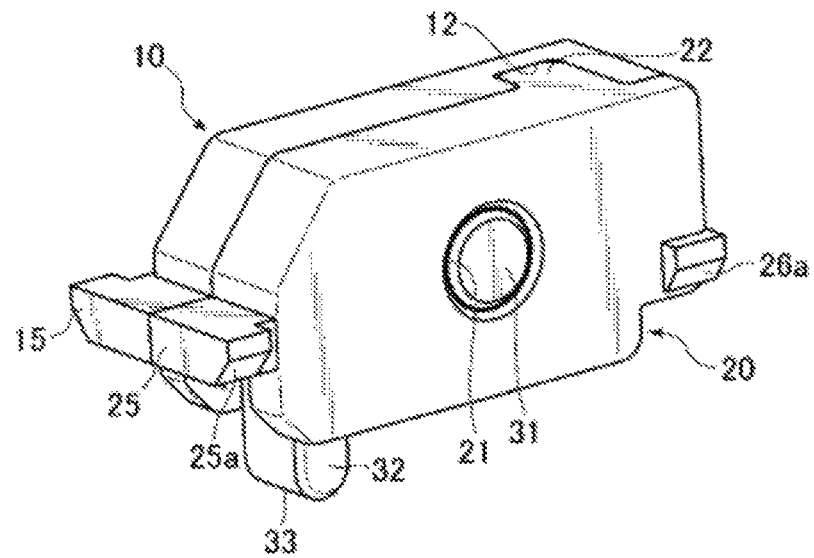
FIG. 1 is a perspective view of a stabilizer according to an embodiment of the present invention.
Figure 2:
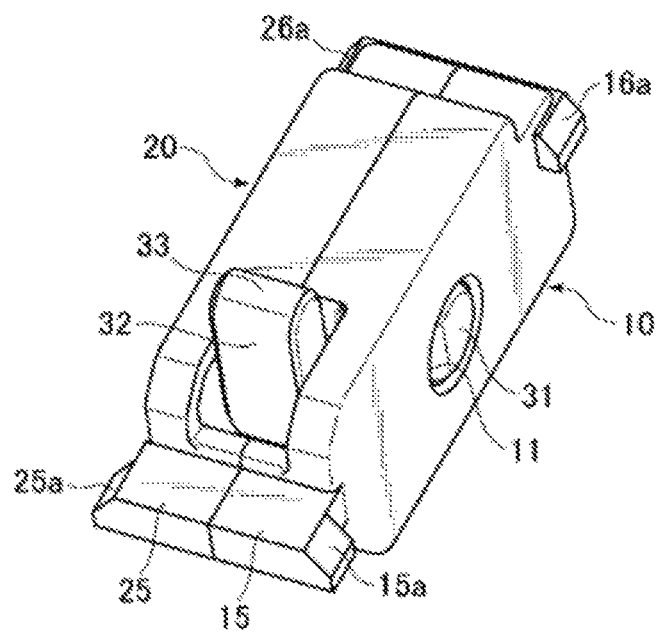
FIG. 2 is a perspective view seen from another direction of the stabilizer of FIG. 1.
Figure 3:
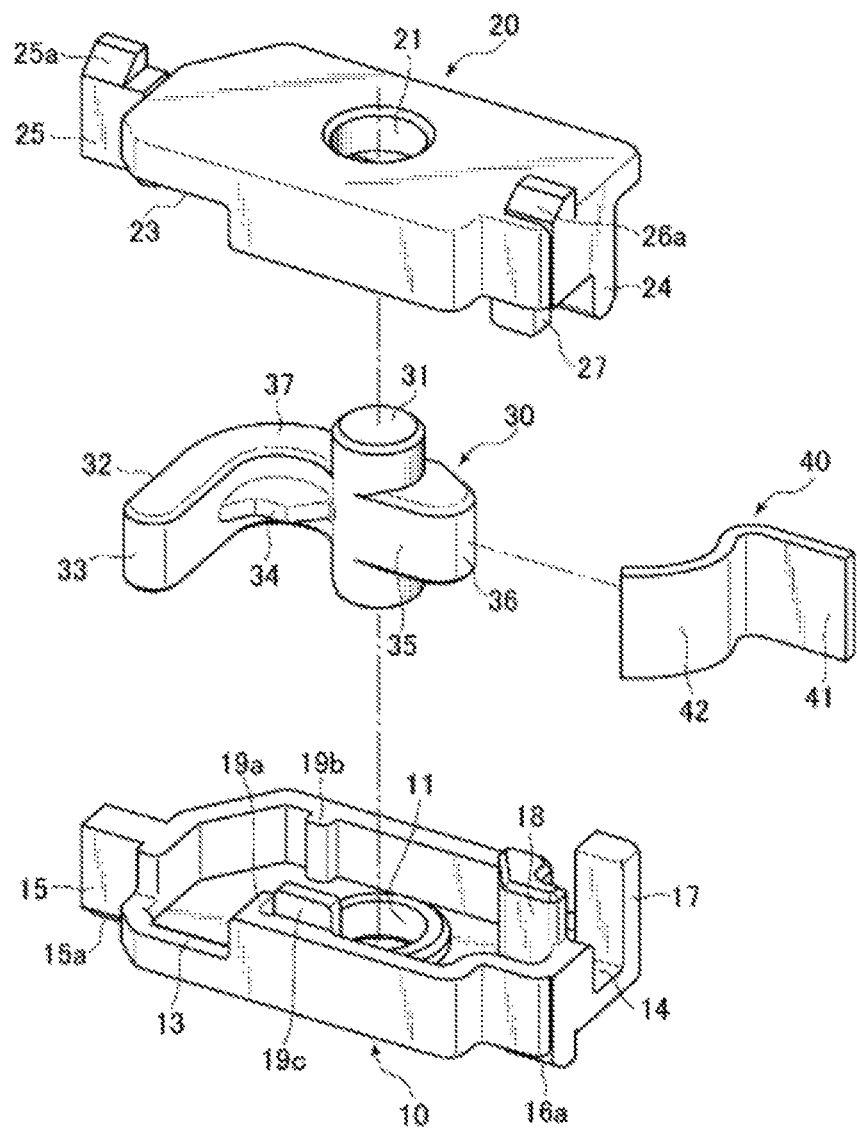
FIG. 3 is an exploded perspective view of the stabilizer of FIG. 1.
Figure 4:
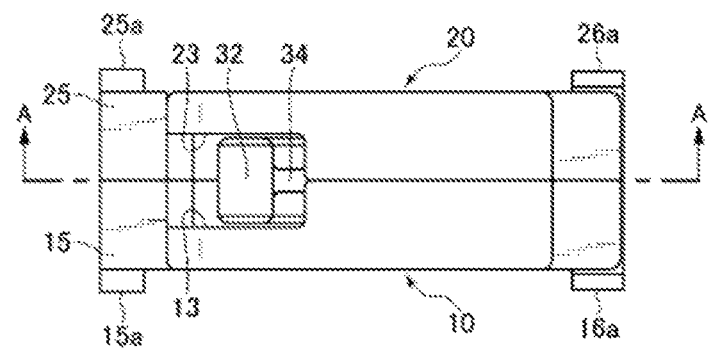
FIG. 4 is a top surface view of the stabilizer of FIG. 1.
Figure 5:
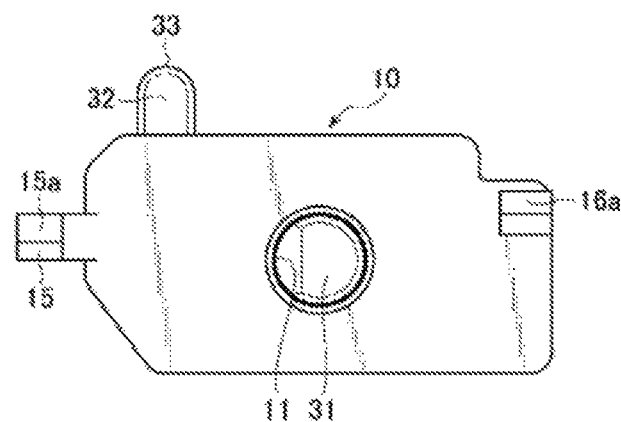
FIG. 5 is a front surface view of the stabilizer of FIG. 1.
Figure 6:
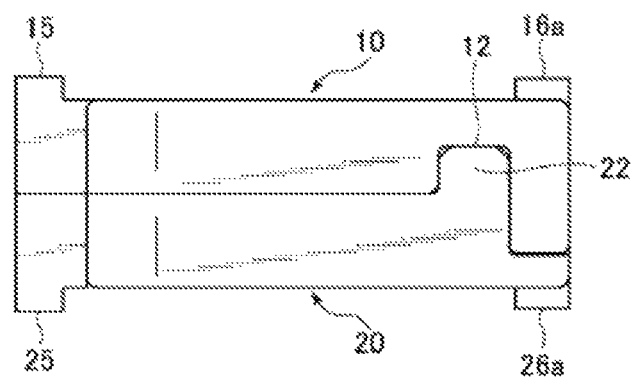
FIG. 6 is a bottom surface view of the stabilizer of FIG. 1.
Figure 7:
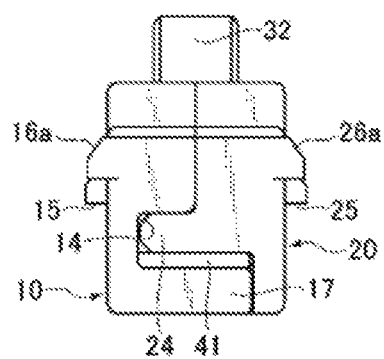
FIG. 7 is a right-side surface view of the stabilizer of FIG. 1.
Figure 8:
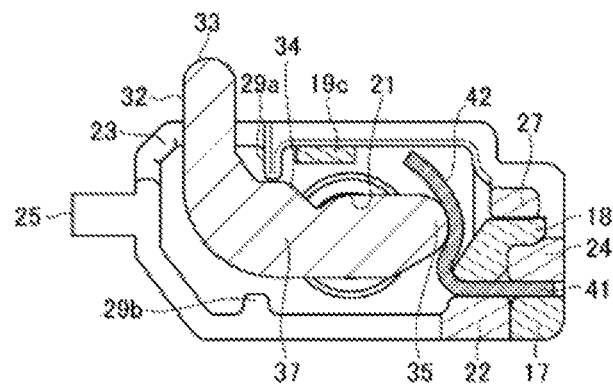
FIG. 8 is a cross-sectional view of the stabilizer of FIG. 1 taken along line A-A in FIG. 4.

Hereinafter, a stabilizer 1 according to an embodiment of the present invention will be described with reference to the drawings. FIG. 1 is a perspective view of a stabilizer 1 according to an embodiment of the present invention. FIG. 2 is a perspective view of the stabilizer 1 as seen from the other direction. FIG. 3 is an exploded perspective view of the stabilizer 1. FIG. 4 is a top side view, FIG. 5 is a front side view, FIG. 6 is a bottom side view, and FIG. 7 is a right-side view of the stabilizer 1. FIG. 8 is a cross-sectional view of the stabilizer 1 taken along the line A-A in FIG. 4.

In the description of the single stabilizer 1 shown in FIG. 1-11, the upward direction in the front surface view of FIG. 5 is referred to as the upward direction, and the lateral direction is referred to as the lateral direction.

Referring to FIG. 3, the stabilizer 1 is provided with a lever 30 having a lever shaft part 31 inside the housing. The lever tip 33 part of the lever 30 protrudes from the opening of the housing and is capable of moving several millimeters. A lever cam part 35 is on the opposite side of the lever tip part 33 of the lever 30. When the lever 30 rotates, the lever cam part 35 pushes and bends the curved surface part 42 of the sheet metal spring 40. The torque required to rotate the lever 30 is substantially constant regardless of the rotation angle of the lever 30. For this reason, the load with which the lever tip part 33 is pressed against the slide member is substantially constant regardless of the distance between the stabilizer 1 and the slide member.

The stabilizer 1 is provided with a first housing 10, a second housing 20, a lever 30, and a sheet metal spring 40. The first housing 10 and the second housing 20 are combined to form a housing. The housing accommodates the lever 30 and the sheet metal spring 40. As shown in FIG. 5, a shaft hole part 11 that accommodates one end part of the lever shaft part 31 is formed in the central part of the front surface of the first housing 10. A shaft hole part 21 that accommodates the other end part of the lever shaft part 31 is formed in the center part of the side surface part of the second housing 20.

As shown in FIG. 4, an opening recess part 13 is formed at the end of the upper surface of the first housing 10. An opening recess part 23 is formed at the end part of the upper surface of the second housing 20. When the first housing 10 and the second housing 20 are assembled, the opening recess part 13 and the opening recess part 23 face each other to form an opening part of the housing. A lever extension part 32 of the lever 30 protrudes from the opening.

A concave long-side recess part 12 is formed near the end part of the surface that meets the second housing 20 of the lower surface of the first housing 10. A convex long-side convex part 22 is formed near the end part of the surface that meets the first housing 10 of the lower surface of the second housing 20. When the first housing 10 and the second housing 20 are combined, the long side concave part 12 of the first housing 10 and the long side convex part 22 of the second housing 20 are combined.

As shown in FIG. 7, a side convex part 17 is formed at the lower end part of the right-side surface of the first housing 10. Further, as shown in FIG. 3, an internal convex part 18 is formed inside the right-side surface.

A side surface convex part 24 is formed on the right-side surface of the second housing 20. A hole (not shown) for receiving the internal protrusion 18 is formed inside the right-side surface of the second housing 20.

As shown in FIG. 3, a corner convex part 27 is formed adjacent to the right-side surface of the second housing 20. A hole (not shown) for receiving the corner part protrusion part 27 is formed adjacent to the right-side surface of the first housing 10.

As shown in FIG. 7, a concave-shaped side concave part 14 is formed adjacent to the side convex part 17 on the right-side surface of the first housing 10. Near the end part of the right-side surface of the second housing 20, a side surface convex part 24 is formed. The side surface recess part 14 of the first housing 10 is capable of accommodating the side surface convex part 24 of the second housing 20 and the end part of the flat plate part 41 of the sheet metal spring 40.

As shown in FIG. 7, the flat plate part 41 of the sheet metal spring 40 can be fixed between the side surface convex part 17 of the first housing 10 and the side surface convex part 24 of the second housing 20. As shown in FIG. 8, the flat plate part 41 of the sheet metal spring 40 can be sandwiched and fixed between the internal convex part 18 of the first housing 10 and the long side convex part 22 of the second housing 20. In this manner, the flat plate part 41 of the sheet metal spring 40 can be firmly fixed.

An extension part 15 is formed on the left side surface of the first housing 10. One of the extension parts 15 is a slope part 15a. An extension part 25 is formed on the left side surface of the second housing 20. One of the extension parts 25 is a slope part 25a. When the first housing 10 and the second housing 20 are assembled, the extension part 15 of the first housing 10 and the extension part 25 of the second housing 20 are aligned. The extension part 15 of the first housing 10 and the extension part 25 of the second housing 20 are used when the stabilizer 1 is attached to a case 60 such as a cup holder.

A slope 16a is formed on the right-side surface of the first housing 10. A slope part 26a is formed on the right-side surface of the second housing 20. The slope part 16a of the first housing 10 and the slope part 26a of the second housing 20 are used when the stabilizer 1 is attached to a case 60 such as a cup holder.

A convex-shaped outer abutting part (alternately: outer contact part) 19a is formed adjacent to the opening concave part 13 on the upper surface of the first housing 10. A convex-shaped outer abutting part (alternately: outer contact part) 29a is formed adjacent to the opening concave part 23 on the upper surface of the second housing 20. With the lever 30 protruding farthest outward from the housing, the lever reinforcing part 34 of the lever 30 abuts the outer abutting parts 19a and 29a.

As shown in FIG. 3, a convex-shaped assembly convex part 19c is formed adjacent to the outer contact part 19a of the first housing 10. A recessed assembly recess part (not shown) is formed adjacent to the inner contact part 29b of the second housing 20. In a state where the first housing 10 and the second housing 20 are assembled, the assembly protrusion part 19c of the first housing 10 is engaged with the assembly recess part of the second housing 20.

Thus, the first housing 10 and the second housing 20 are firmly assembled by combining the convex part and the concave part.

A convex inner contact part 19b is formed inside the lower surface of the first housing 10. A convex inner contact part 29b is formed inside the lower surface of the second housing 20. The outer surface of the curved part of the lever 30 abuts the inner contact parts (alternately: inner abutting parts) 19b and 29b in a state in which the lever 30 is farthermost within the housing.

The lever 30 has a lever shaft part 31 at the center. Both end parts of the lever shaft part 31 are accommodated in the shaft hole part 11 of the first housing 10 and the shaft hole part 21 of the second housing 20. The lever 30 is rotatable at a constant angle about the lever shaft part 31 as an axis. The lever 30 has a lever body part 37 extending from the lever shaft part 31, and a lever extension part 32 extending from the lever body part 37 in a right-angle direction. FIG. 8 is a cross-sectional view of the stabilizer 1 taken along the line A-A in FIG. 4. The outer surface between the lever body 37 and the lever extension part 32 is a curved surface. The tip part of the lever extension part 32 is a lever tip part 33. The lever tip part 33 is a curved surface having a circular arc cross section.

In the home position shown in FIG. 8, the axis of the lever body part 37 extends in a horizontal direction parallel to the upper surface and the lower surface of the first housing 10 and the second housing 20.

A thin lever reinforcing part 34 is formed inside the part of the lever extending part 32 that bends in an L shape, and the lever extending part 32 is reinforced. In the home position, the lever reinforcing part 34 contacts the outer contact parts 19a and 29a, and the outward movement of the lever 30 is restricted.

A lever cam part 35 extends in the direction opposite to the lever extension part 32 of the lever 30. The axis of the lever cam part 35 extends from the lever body part 37 at a certain angle. The lever cam part 35 becomes thinner toward the tip.

A tip end part of the lever cam part 35 is a lever contact part 36. The lever contact part 36 contacts the sheet metal spring 40. The lever contact part 36 is a curved surface having an arc shape in cross section.

Figure 9:
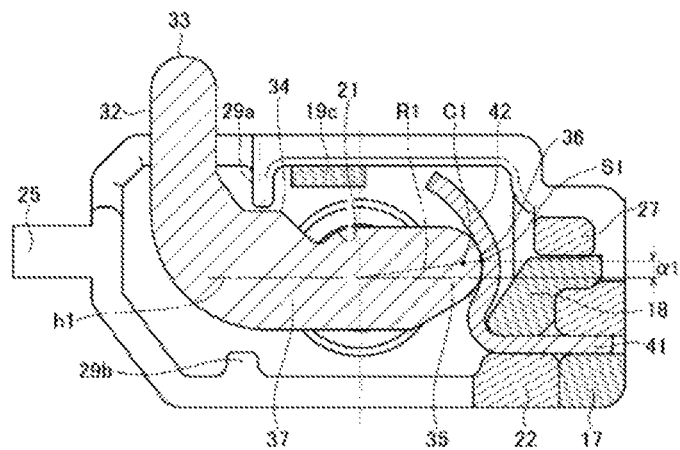
FIG. 9 is an enlarged view of FIG. 8.

As shown in FIG. 9, the distance from the axis of the lever shaft part 31 to the lever contact part 36 is R1. When the lever extension part 32 of the lever 30 is pushed into the housing, the lever contact part 36 at the tip part of the lever cam part 35 draws an arc having a radius R1 with the axis of the lever shaft part 31 as the center.

The sheet metal spring 40 is a spring of a shape formed by bending a flat metal. The sheet metal spring 40 has a flat plate part 41 having a flat plate shape, and a curved surface part 42 having a curved cross section. The flat plate part 41 is a part that is sandwiched and fixed between the first housing 10 and the second housing 20. Although the flat plate part 41 is used in the embodiment of the present invention, it does not have to be flat as long as the metal plate spring 40 can be fixed to the housing. The curved surface part 42 is a part that is bent by being pressed by the lever contact part 36. The curved surface part 42 has an arc shape with a radius R2. The radius R2 is smaller than the radius R1 around which the lever contact part 36 rotates.

The stabilizer 1, in which the lever 30 and the sheet metal spring 40 are disposed inside the housing in which the first housing 10 and the second housing 20 are assembled, will be described.

As shown in FIG. 8, the lever 30 and the sheet metal spring 40 are accommodated in a housing. The lever extension part 32 of the lever 30 protrudes from an opening formed by the opening recess part 13 of the first housing 10 and the opening recess part 23 of the second housing 20. The sheet metal spring 40 is in the housing. The flat plate part 41 of the sheet metal spring 40 is fixed to the housing.

The lever contact part 36 at the tip of the lever cam part 35 of the lever 30 is in contact with the curved surface part 42 of the sheet metal spring 40. The curved surface part 42 of the sheet metal spring 40 is pushed by the lever contact part 36 and can be bent in the housing.

Between the side surface convex part 17 of the first housing 10 and the side surface convex part 24 of the second housing 20, the end part of the flat plate part 41 of the sheet metal spring 40 is sandwiched and fixed. A side far from the end part of the flat plate part 41 of the sheet metal spring 40 is fixed between the inner convex part 18 of the first housing 10 and the long side convex part 22 of the second housing 20. The flat plate part 41 of the sheet metal spring 40 is firmly fixed so as not to move when a load is applied to the curved surface part 42.

Figure 10:
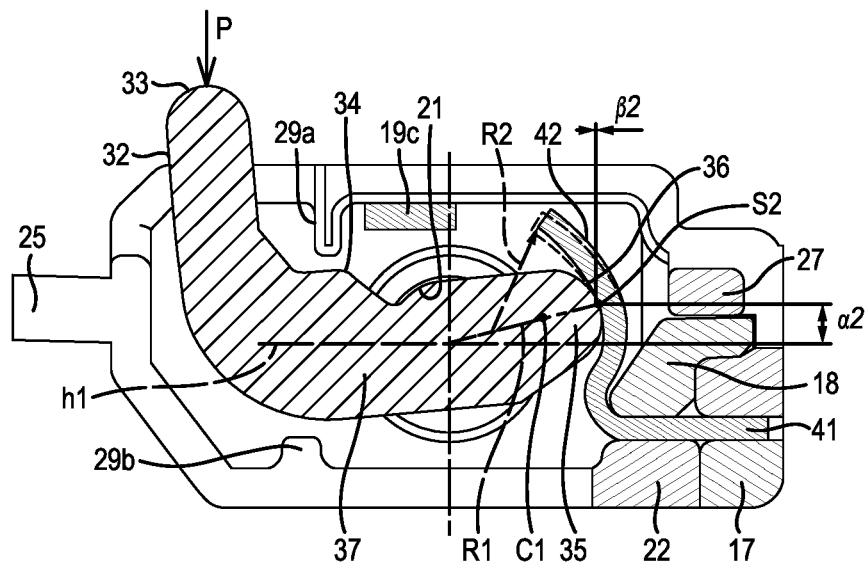
FIG. 10 is a cross-sectional view showing a state in which the lever extension part is slightly inside the housing from the state of FIG. 9.
Figure 11:
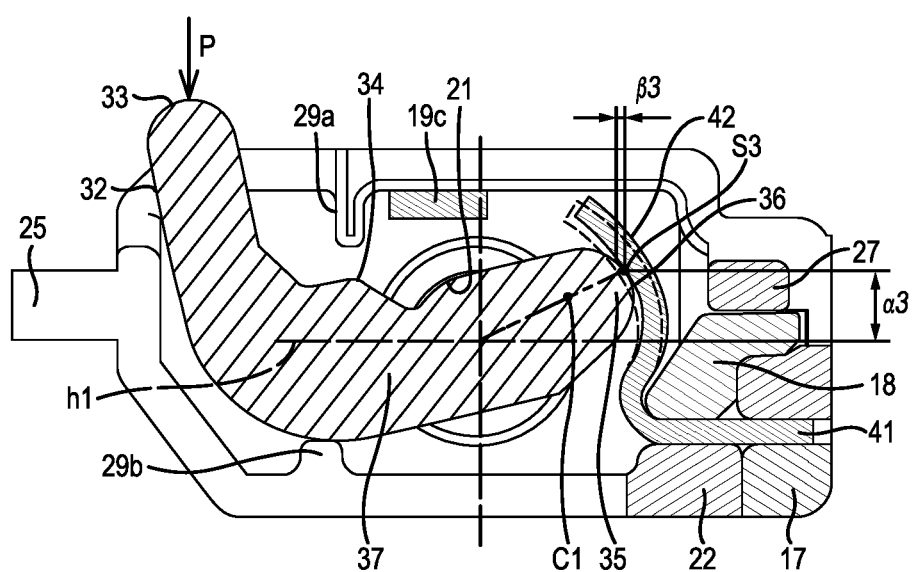
FIG. 11 is a cross-sectional view showing a state in which the lever extension part is slightly further inside the housing from the state of FIG. 10.

The movement of the stabilizer 1 when the lever tip 33 is pushed will be described with reference to FIGS. 9-11. FIG. 9 is an enlarged view of FIG. 8. The lever reinforcing part 34 is in contact with the outer contact part 29a, and the lever extension part 32 protrudes farthermost outside of the housing. The lever 30 is in the home position. FIG. 10 is a cross-sectional view showing a state in which the lever extension part 32 is pushed in the direction of arrow P from the state of FIG. 9. FIG. 11 is a cross-sectional view showing a state in which the lever extension part 32 is further pushed in the direction of arrow P from the state of FIG. 10. The outside of the curved part of the lever extension part 32 abuts on the inside abutment parts 19b and 29b, and the lever extension part 32 cannot enter further inside.

In FIG. 9, the lever contact part 36 at the tip part of the lever cam part 35 is in contact with the curved surface part 42 of the sheet metal spring 40 at the contact S1 and presses the curved surface part 42. The contact S1 is a point where the lever contact part 36 applies a load to the curved surface part 42 of the sheet metal spring 40 at the home position.

In the state of FIG. 9, the sheet metal spring 40 is pushed by the lever contact part 36 and bent to some extent. The bending β of the sheet metal spring 40 at the home position in FIG. 9 is made to be 0.

The lower surface of the lever body part 37 at the home position is a horizontal plane. The lever cam part 35 becomes thinner toward the lever contact part 36 at the tip part. The center line C1 of the lever cam part 35 is at a certain angle with respect to a horizontal plane parallel to the upper and lower surfaces of the housing.

A vertical distance from the horizontal plane h1 passing through the axis of the lever shaft part 31 to the contact S1 is defined as α1.

In FIG. 10, the lever extension part 32 is slightly inside the housing. The curved surface part 42 of the sheet metal spring 40 is pushed by the lever contact part 36. For contrast, the position of the curved surface part 42 in the state of FIG. 9 is indicated by a broken line.

The center line C1 of the lever cam part 35 is at a larger angle with respect to the horizontal plane h1 than the home position shown in FIG. 9. The vertical distance from the horizontal plane h1 passing through the axis of the lever shaft part 31 to the contact S2 between the lever contact part 36 and the curved surface part 42 of the sheet metal spring 40 is α2, which is larger than α1.

Since the radius R2 of the curved surface part 42 of the sheet metal spring 40 is smaller than the radius R1 at which the lever contact part 36 rotates, so that the curved surface part 42 of the sheet metal spring 40 moves slightly to the right from the state of FIG. 9. Compared to FIG. 9, the bending amount of the curved surface part 42 of the sheet metal spring 40 at the contact S2 is β2.

In FIG. 11, the lever extension part 32 further enters the inside part of the housing, and the outer side of the curved part of the lever extension part 32 is in contact with the inner contact parts 19b and 29b. The curved surface part 42 of the sheet metal spring 40 is further pushed by the lever contact part 36. For contrast, the position of the curved surface part 42 in the state of FIG. 9 is indicated by a broken line.

The center line C1 of the lever cam part 35 is at a larger angle with respect to the horizontal plane h1. The vertical distance between the contact point S3 between the lever contact part 36 and the curved surface part 42 of the sheet metal spring 40, and the horizontal plane h1, is α3 which is larger than α2.

The curved surface part 42 of the sheet metal spring 40 has moved further to the right than the state of FIG. 10. Compared to FIG. 9, the amount of bending of the curved surface part 42 of the sheet metal spring 40 at the contact S3 is β3.

As the lever extension part 32 is pushed into the housing, the α dimension increases from α1 to α3. The α dimension is the vertical distance from the horizontal plane h1 passing through the axis of the lever shaft part 31 to the contact S1; as the α dimension increases, the contact point S that bends the curved surface part 42 of the sheet metal spring 40 moves away from the boundary part between the fixed flat plate part 41 and the curved surface part 42 that can be bent. That is, the distance from the flat plate part 41 to which the sheet metal spring 40 is fixed to the contact S increases. Therefore, as the lever extension part 32 is pushed in, the load necessary to bend the curved surface part 42 decreases.

On the other hand, as the lever extension 32 is pushed in, the β dimension, which is the amount of bending of the sheet metal spring 40, increases. Here, the β dimension refers to the length projected in the vertical direction of the length from the contact point S between the lever contact part 36 and the curved surface part 42 of the sheet metal spring 40 to the point where the curve inside the curved surface part 42 intersects the center line C1 of the lever cam part 35 when the lever 30 is at the home position, on the center line C1 of the lever cam part 35.

More simply, the length in which the tip end part of the curved surface part 42 is displaced in the horizontal direction from the position of the tip end part of the curved surface part 42 of the sheet metal spring 40 when the lever 30 is at the home position may be set as the β dimension.

The contact S between the lever contact part 36 and the curved surface part 42 of the sheet metal spring 40 draws an arc having a radius R1 with the lever shaft part 31 as the center. The curved surface part 42 which is a movable part of the sheet metal spring 40 has an arc shape with a radius R2 smaller than R1. Therefore, when the contact S between the lever contact part 36 and the sheet metal spring 40 moves upward from S1 to S3, the bending β of the sheet metal spring 40 increases. As the bending β of the sheet metal spring 40 increases, the load increases rapidly. Therefore, as the lever extension part 32 is pushed in, the load necessary to bend the sheet metal spring 40 increases.

As the lever extension part 32 is pushed in, both the alpha dimension and the β dimension increase. As the α dimension increases, the load required to bend the sheet metal spring 40 decreases. As the β dimension increases, the load required to bend the sheet metal spring 40 increases rapidly. The increase in dimension α is greater than the increase in the β dimension.

Therefore, the decrease in load due to the increase in the α dimension cancels out the increase in load due to the increase in the β dimension. In the process in which the lever extension part 32 is pushed and the lever cam part 35 bends the sheet metal spring 40, the load required to bend the sheet metal spring 40 is substantially constant.

The stabilizer 1 is attached to a fixing member. The lever tip part 33 of the stabilizer 1 is pressed against the surface of the slide member. Even if the distance between the fixing member to which the stabilizer 1 is attached and the slide member changes, the lever tip part 33 remains pressed against the slide member, and the length of the lever extension 32 protruding from the housing changes. In this case, the load for bending the sheet metal spring 40 is almost constant. Therefore, the load with which the lever tip part 33 presses the slide member is substantially constant.

FIG. 12 to FIG. 19 are examples in which the stabilizer 1 according to the embodiment of the present invention is used as the slide structure of the pull-out cup holder. In FIG. 12 to FIG. 19, the depth direction of the front view of FIG. 15 will be described as the horizontal direction, the horizontal direction as the depth direction, and the vertical direction as the up and down direction. These directions are different from the directions in which the stabilizer 1 is described with reference to FIGS. 1-11.

Figure 12:
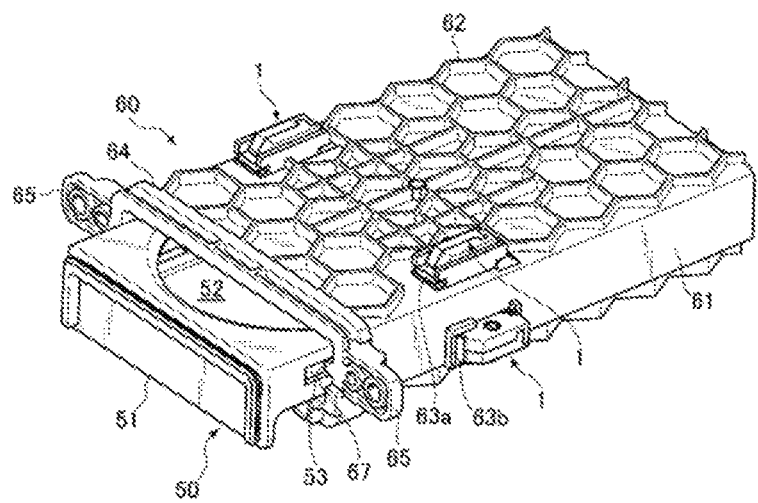
FIG. 12 is a perspective view showing a state in which the holder is almost housed in the case.

FIG. 12 is a perspective view showing a holder 50 (sliding member) that holds a cup and a case 60 (fixing member) that accommodates the holder 50. In order to hold the holder 50 in a slidable manner, two stabilizers 1 are attached to the upper surface of the case 60 and one on the side surface. The lever tip end part 33 of the stabilizer 1 on the upper surface of the case 60 is in contact with the upper surface of the holder 50. The lever tip part 33 of the stabilizer 1 on the side surface of the case 60 is in contact with the side surface of the holder 50.

Figure 13:
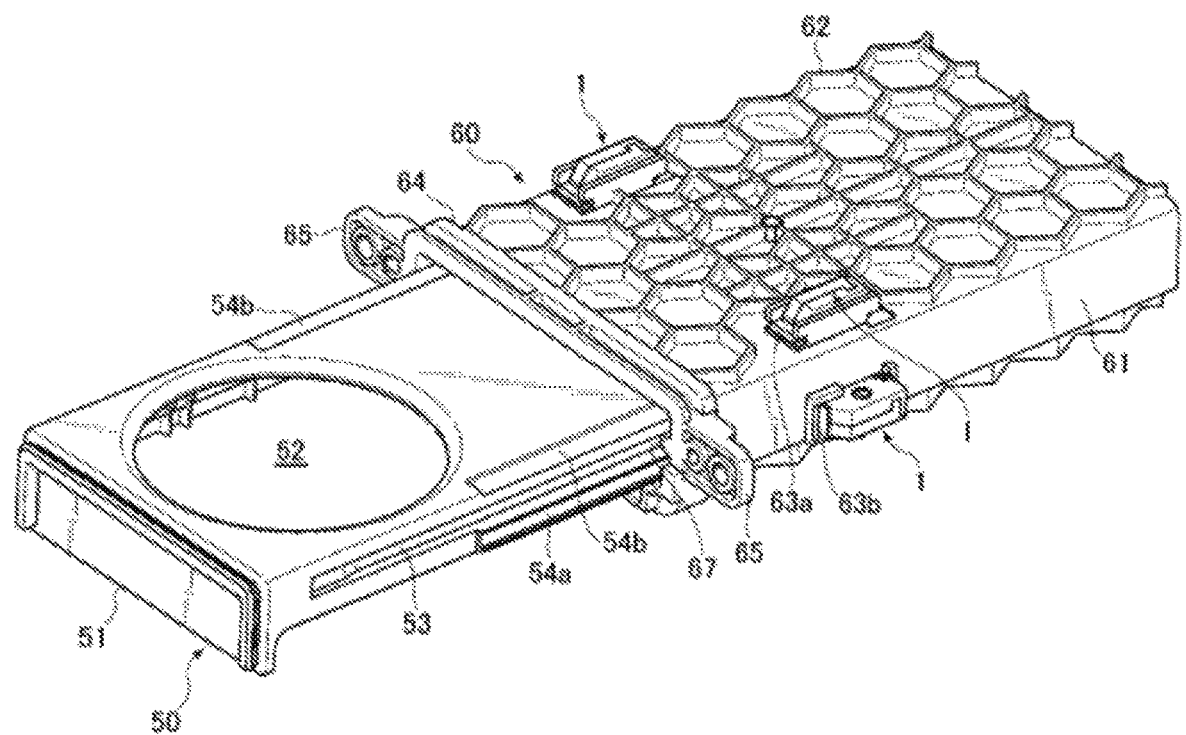
FIG. 13 is a perspective view showing a state in which the holder is pulled out from the case.

FIG. 12 shows a state in which the holder 50 is almost accommodated, and FIG. 13 shows a state in which the holder 50 is fully pulled out.

The holder 50 will now be described. A drawer part 51 for pulling out the holder 50 is formed on the compartment side of the holder 50. A cup hole 52 for holding a cup, such as a coffee cup, is formed slightly behind the drawer part 51. As shown in FIG. 13, groove parts 53 extend in the depth direction on the side surface parts on both sides of the holder 50. A protrusion 67 is provided from the case frame part 64 of the case 60 along the inside of the side surface of the case 60; the protrusion 67 is disposed in the groove part 53. The protrusion 67 functions as a support part that supports the holder 50 in a slidable manner in cooperation with the groove part 53.

Under the groove 53 on the side surface on both sides of the holder 50, a grounding surface 54*a* having a smooth surface extends in the depth direction. The lever tip part 33 of the stabilizer 1 is brought into contact with and pressed against the grounding surface 54*a*.

On both end parts of the upper surface of the holder 50, the surface is lowered, and a smooth grounding surface 54*b* extends in the depth direction. Both end parts in the horizontal direction on the upper surface of the holder 50 have rounded corners, but the grounding surface 54*b* is formed by cutting and flattening the corner parts. The lever tip part 33 of the stabilizer 1 on the upper surface of the case 60 is in contact with the grounding surface 54*b*.

The case 60 will now be described. The case 60 has a box-type base part 61 that surrounds the holder 50. On the upper surface and the lower surface of the base part 61, a honeycomb part 62 having a hexagonal cross section is provided. The honeycomb part 62 reinforces the base part 61. In the case 60, an attachment part 63*a* for attaching the stabilizer 1 is formed. The base part 61 and the honeycomb part 62 are integrally formed.

A mounting part 63*b* for mounting the stabilizer 1 is formed on the side surface of the case 60.

The case 60 has a case frame part 64 to surround the holder 50 at one end part. Inside the case 60, a pair of protrusions 67 are formed inward. The protrusions 67 enter the groove part 53 on the side surface on both sides of the holder 50 and function as support parts so that the holder 50 can slide. The protrusions 67 function as support parts that are slidably supported in cooperation with the groove part 53.

A panel fixing part 65 is provided outside the case frame part 64. The panel fixing part 65 is formed with a screw fixing hole. The case 60 can be fixed to the panel by inserting a screw into the hole of the panel fixing part 65.

A panel fixing part 66 is also provided on the lower side of the case 60. The panel fixing part 66 is formed with a screw fixing hole.

A pair of stabilizers 1 is attached to both sides of the upper surface of the case 60. On the upper surface of the case 60, mounting parts 63*a* are formed for fitting the extension parts 15 and 25 of the housing of the stabilizer 1 and the slope parts 16*a* and 26*a*.

Under the attachment part 63*a* of the case 60, a hole through which the lever extension part 32 passes is formed.

The attachment part 63*a* has a structure in which the extension parts 15 and 25 of the stabilizer 1 are fitted in a groove, but the method of attaching the stabilizer 1 to the case 60 is not limited. and it can be attached by any method.

In the stabilizer 1 attached by being engaged with the attachment part 63*a* on the upper surface of the case 60, the lever extension part 32 protrudes on the lower side, and the lever tip part 33 comes into contact with the grounding surface 54*b* of the holder 50. When the holder 50 is pulled out, even if the distance between the lower surface of the housing of the stabilizer 1 and the grounding surface 54*b* of the holder 50 varies, the lever tip part 33 abuts against the grounding surface 54*b* and the pressing force is constant.

In the embodiment of the present invention, it is not necessary to finely adjust the dimensions of the surface of the case 60 to which the stabilizer 1 is attached and the grounding surfaces 54*a* and *b* of the holder 50.

In addition, even if the distance between the housing surface of the stabilizer 1 and the grounding surfaces 54*a, b* of the holder 50 varies due to variations in mass production, the force with which the lever tip part 33 presses the grounding surfaces 54*a, b* is constant. Therefore, the holder 50 can be pulled out smoothly. When operating the holder 50, there is no problem such as rattling or abnormal noise.

Figure 17:
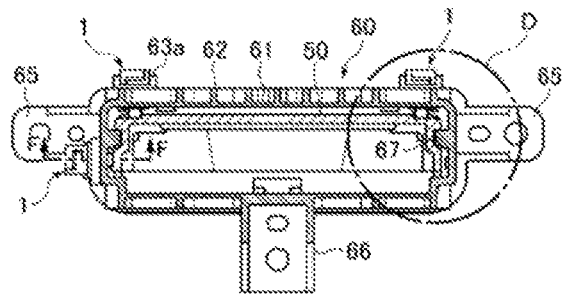
FIG. 17 is a cross-sectional view of the holder and case of FIG. 12 along the line cc of FIG. 12.
Figure 18:
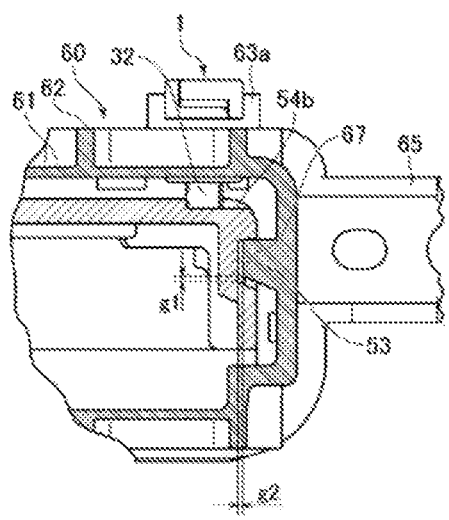
FIG. 18 is an enlarged view of a D part of the holder and case of FIG. 17.

FIG. 18 is an enlarged view of a part D in FIG. 17. The horizontal direction of FIGS. 17 and 18 is horizontal, and the vertical direction is the height direction. A stabilizer 1 is attached to the upper side of the case 60. The lever extension part 32 of the stabilizer 1 passes through the hole of the base part 61 of the case 60, the lever tip part 33 of the tip part of the lever extension part 32 abuts the grounding surface 54*b* on the upper surface of the holder 50, and presses downward.

The protrusion 67 of the case 60 is accommodated in the groove part 53 on the side surface of the holder 50 and is held so that the holder 50 can slide. There is a slight gap g2 open between the lateral tip part of the protrusion 67 of the case 60 and the side surface of the groove part 53 on the side surface of the holder 50. Since the holder 50 has a gap in the lateral direction, the holder 50 can slide smoothly without fine dimensional adjustment.

Since the holder 50 is pushed downward by the lever tip 33, the upper end part of the protrusion 67 of the case 60 and the upper surface of the groove 53 on the side surface of the holder 50 are in close contact.

The lower end part of the protrusion 67 of the case 60 and the bottom surface of the groove 53 on the side surface of the holder 50 have a slight gap g1 open in the up-down direction. The holder 50 can slide smoothly without finely adjusting the dimensions.

The upper surface of the groove part 53, to which force is applied by the lever tip part 33, is in contact with the upper surface of the protrusion 67. A gap g1 is provided between the lower surface of the groove part 53 and the lower surface of the protrusion 67.

As shown in FIG. 18, the lever tip part 33 is in contact with the grounding surface 54*b* on the upper surface of the holder 50 and presses downward. The grounding surface 54*b* is a surface with a corner part cut flat. For this reason, the lever tip part 33 also supports the left wall part of the grounding surface 54*b*. Similarly, there is a stabilizer 1 on the left side of the upper surface of FIG. 17. The lever tip part 33 of the left stabilizer 1 is in contact with the left grounding surface 54*b* on the upper surface of the holder 50 and presses downward. The lever tip part 33 also supports the right wall part of the grounding surface 54*b* on the left side of the upper surface.

That is, the holder 50 is held by the pair of left and right lever tip parts 33 on the upper surface of the case 60 so as not to be displaced in the lateral direction. The pair of left and right lever tip parts 33 is configured such that the holder 50 allows a slight shift in the lateral direction.

As described above, when the stabilizer 1 on the upper surface of the case 60 presses the holder 50 downward and supports the holder 50 so as not to be displaced laterally, the stabilizer 1 on the side surface of the case 60 may be omitted.

Figure 14:
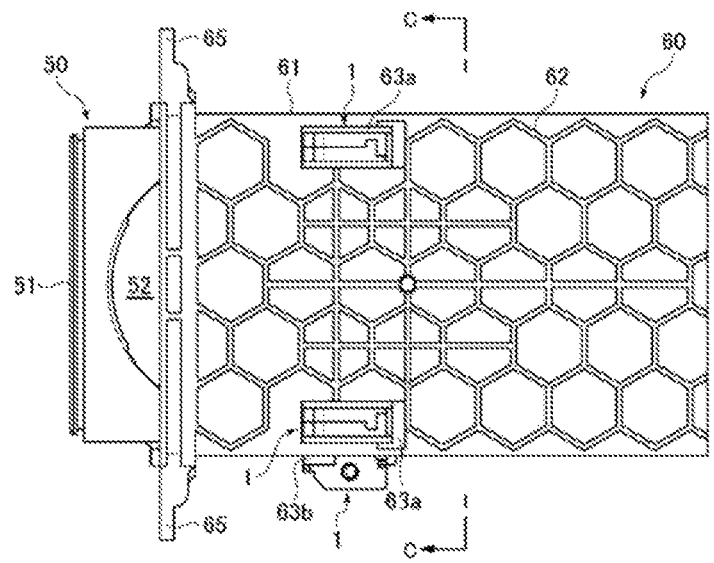
FIG. 14 is a top surface view of the holder and case of FIG. 12.
Figure 15:
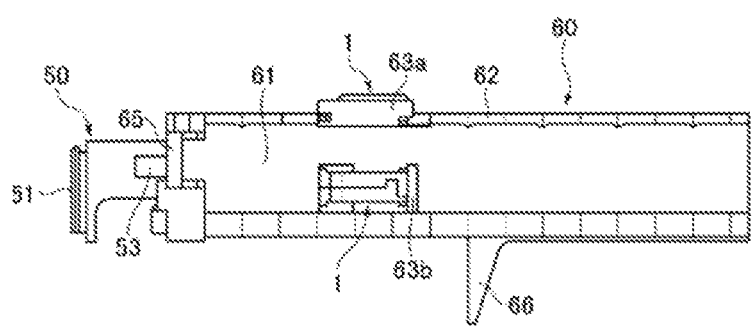
FIG. 15 is a front surface view of the holder and case of FIG. 12.
Figure 16:
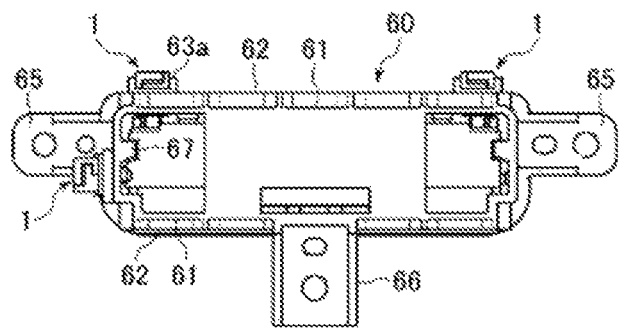
FIG. 16 is a right-side surface view of the holder and case of FIG. 12.
Figure 19:
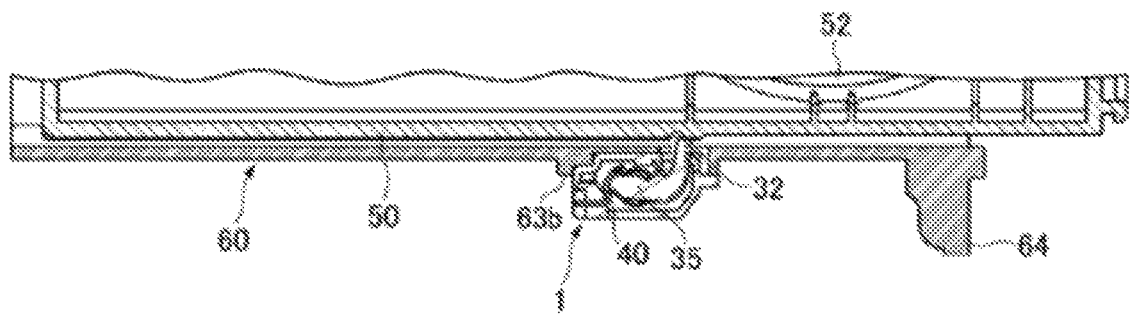
FIG. 19 is a cross sectional view of the holder and case of FIG. 17 taken along line F-F.

FIG. 17 is a cross-sectional view taken along line c-c in FIG. 14, and FIG. 19 is a cross-sectional view taken along line FF in FIG. 17. One stabilizer 1 is attached to the side of the case 60.

On the side surface of the case 60 are formed mounting parts 63b for fitting the extension parts 15 and 25 of the housing of the stabilizer 1 and the slope parts 16a and 26a.

The stabilizer 1 is attached to the left side surface of the case 60. As described above, the stabilizer 1 on the side surface of the case 60 may be omitted.

When the stabilizer 1 on the side surface of the case 60 is attached, the lever extension part 32 protrudes on the side of the stabilizer 1 and the lever tip part 33 comes into contact with the grounding surface 54a. When pulling out the holder 50, even if the lateral distance between the side surface of the case 60 to which the housing of the stabilizer 1 is attached and the grounding surface 54a of the holder 50 varies, the lever tip part 33 contacts the grounding surface 54a, and the pressing force is constant.

Since the holder 50 is pushed laterally by the lever tip part 33, the right end part of the protrusion 67 of the case 60 and the side of the groove part 53 on the side of the holder 50 are spaced apart by g2 from each other on the left side surface.

The stabilizer 1 is not attached to the right-side of FIG. 17. Since the holder 50 is pushed rightward by the lever tip part 33 of the stabilizer 1, the left end part of the protrusion 67 of the case 60 and the side of the groove part 53 on the side of the holder 50 are in close contact with each other on the right-side surface.

In the embodiment of the present invention, even if the distance from the lever tip part 33 of the stabilizer 1 to the surface of the holder 50 changes, the surface of the holder 50 is pressed with substantially the same load within the movable range of the lever tip part 33, so that the load when the holder 50 is slid hardly changes. Therefore, it is not necessary to finely adjust the dimensions of the case 60 and the holder 50.

Further, even when the holder 50 has dimensional variations, the load when the holder 50 is slid hardly changes. Therefore, the load required for the operation of the holder 50 is constant, and there is no rattling or abnormal noise even when the holder 50 is inserted or removed.

It will be appreciated by persons skilled in the art that the above embodiments of the present invention have been described by way of example only, and not in any limitative sense, and that various alterations and modifications are possible without departure from the scope of the present invention as defined by the appended claims.

DESCRIPTION OF REFERENCE NUMERALS

1 Stabilizer
10 1st housing
11 Shaft hole part
12 Long side recess part
13 Opening recess part
14 Side recess part
15 Extension part
15a Slope part
16a Slope part
17 Side surface projection part
18 Internal convex part
19a Outer contact part
19b Inner contact part
19c Assembly protrusion part
20 Second housing
21 Shaft hole part
22 Long side convex part
23 Opening recess part
24 Side surface convex part
25 Extension part
25a Slope part
26a Slope part
27 Corner protrusion part
29a Outer contact part
29b Inner contact part
30 Lever
31 Lever shaft part
32 Lever extension part
33 Lever tip part
34 Lever reinforcement part
35 Lever cam part
36 Lever contact part
37 Lever body part
40 Sheet metal spring
41 Flat part
42 Curved surface part
50 Holder
51 Drawer part
52 Cup hole part
53 Groove part
54a, 54b Grounding surface
60 Case
61 Base part
62 Honeycomb part
63a, b Mounting part
64 Case frame part
65 Panel fixing part
66 Panel fixing part
67 Protrusion (support part)

What is claimed is:

1. A stabilizer attachable to a fixing member for slidably supporting a slide member within the fixing member; the stabilizer comprising:
    a housing partially defining a through opening;
    a lever having a lever shaft part pivotably mounted in the housing, a lever body part extending in a first radial direction from the lever shaft part, a lever extension part extending at first angle from the lever body part, and a lever cam part extending in a second radial direction substantially opposite to the lever body part from the lever shaft part;
    a sheet metal spring located in the housing and having a flat plate part fixed to the housing, and a curved surface part that is adjacent to the flat plate part and can be bent by contact with a lever contact part at a tip of the lever cam part; and
    wherein a lever tip part of the lever extension part protrudes through the opening of the housing.

2. The stabilizer according to claim 1, wherein the first angle between the lever extension part and the lever body part is a right-angle.

3. The stabilizer according to claim 1, wherein an axis of the lever cam part of the lever extends at a second angle with respect to an axis of the lever body part.

4. The stabilizer according to claim 1, wherein the housing further includes: a shaft hole part rotatably supporting the lever shaft part; a recess partially defining the opening for the lever extension part to extend out of the housing, and a flat plate part fixing part for fixing the flat plate part of the sheet metal spring.

5. The stabilizer according to claim 1, wherein the curved surface part of the sheet metal spring defines a radius of curvature smaller than a radius of rotation at which the lever contact part of the lever cam part of the lever rotates about the lever shaft part.

6. The stabilizer according to claim 1, wherein when the lever cam part of the lever rotates about the lever shaft part, the lever contact part pushes against the curved surface part of the sheet metal spring to bend the curved surface part.

7. The stabilizer according to claim 1, wherein, when the lever cam part of the lever rotates about the lever shaft part, the distance from a boundary between the flat plate part and the curved surface part, to which the sheet metal spring is fixed, to a contact point, where the lever contact part pushes on the curved surface part of the sheet metal spring, increases.

8. The stabilizer according to claim 1, wherein the housing further includes: an outer abutting part that restricts movement of the lever tip part of the lever to the outside of the housing, and an inner abutting portion for restricting movement of the lever tip part of the lever into the housing.

9. The stabilizer according to claim 8, wherein the lever further includes a lever reinforcing part located inside the first angle between the lever body part and the lever extension part, the lever reinforcing part restricts movement of the lever tip part of the lever to the outside of the housing and reinforces the lever.

10. An assembly comprising:
a fixing member including a base part, a stabilizer mounting part formed on the base part, and a support part;
a slide member slidably supported within the fixing member by the support part;
a stabilizer attached to the fixing member at the stabilizer mounting part, and including:
a housing partially defining an opening;
a lever including: a shaft housed in the housing, a lever body extending radially from the lever shaft, a lever extension extending at a first angle from the lever body, a tip of the lever extension extending out of the opening in the housing, and a lever cam extending from the lever shaft in a direction opposite to the lever body;
a sheet metal spring including: a flat plate part fixed to the housing, and a curved surface part extending from the flat plate part, the curved surface part capable of being bent by contact with the lever cam; and
wherein the slide member has a grounding surface that is supported by the support part, and the tip of the lever extension of the stabilizer is able to contact the grounding surface.

11. The assembly according to claim 10, wherein the stabilizer is attached to a side surface of the fixing member, and the tip of the lever extension is in contact with the grounding surface on a side surface of the slide member.

12. The assembly according to claim 10, wherein the fixing member is a case, and the slide member is a holder accommodated in the case.

13. The stabilizer according to claim 1, wherein the curved surface part of the sheet metal spring is concave facing to the lever cam part, and the lever cam part is operable to bend the curved surface part by acting on a concave face of the sheet metal spring.

14. The assembly according to claim 10, wherein the curved surface part of the sheet metal spring is concave facing to the lever cam, and the lever cam is operable to bend the curved surface part by acting on a concave face of the sheet metal spring.

15. An assembly comprising:
a fixing member including a base part, a stabilizer mounting part formed on the base part, and a support part;
a slide member slidably supported within the fixing member by the support part;
a stabilizer attached to the fixing member at the stabilizer mounting part, and including:
a housing partially defining an opening;
a lever including: a shaft housed in the housing, a lever body extending radially from the lever shaft, a lever extension extending at a first angle from the lever body, a tip of the lever extension extending out of the opening in the housing, and a lever cam extending from the lever shaft in a direction opposite to the lever body;
a sheet metal spring including: a flat plate part fixed to the housing, and a curved surface part extending from the flat plate part, the curved surface part capable of being bent by contact with the lever cam; and
wherein the slide member has a grounding surface that is supported by the support part, and the tip of the lever extension of the stabilizer is able to contact the grounding surface; and
wherein the stabilizer is attached to an upper surface of the fixing member, and the tip of the lever extension is in contact with the grounding surface on an upper surface of the slide member.

16. The assembly according to claim 10, wherein the stabilizer is attached to an upper surface of the fixing member, and the tip of the lever extension is in contact with the grounding surface on an upper surface of the slide member.

17. The assembly according to claim 16, wherein the stabilizer is a first stabilizer, and the assembly further includes a second stabilizer attached to the upper surface of the fixing member.

18. The assembly according to claim 15, wherein the stabilizer is attached to a side surface of the fixing member, and the tip of the lever extension is in contact with the grounding surface on a side surface of the slide member.

19. The assembly according to claim 15, wherein the stabilizer is a first stabilizer, and the assembly further includes a second stabilizer attached to the upper surface of the fixing member.

20. The assembly according to claim 15, wherein the fixing member is a case, and the slide member is a holder accommodated in the case.

* * * * *